(12) United States Patent
Gadiya et al.

(10) Patent No.: US 11,537,786 B2
(45) Date of Patent: Dec. 27, 2022

(54) GENERATING FILLABLE DOCUMENTS AND FILLABLE TEMPLATES IN A COLLABORATIVE ENVIRONMENT

(71) Applicant: Dropbox, Inc., San Francisco, CA (US)

(72) Inventors: Rohan Gadiya, Fremont, CA (US); Durgeshkumar Patel, Rocklin, CA (US); Anusha Balasubramaniam, San Jose, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/099,583

(22) Filed: Nov. 16, 2020

(65) Prior Publication Data

US 2022/0156456 A1 May 19, 2022

(51) Int. Cl.
*G06F 40/186* (2020.01)
*G06F 40/174* (2020.01)
*G06V 30/412* (2022.01)
*G06V 30/418* (2022.01)

(52) U.S. Cl.
CPC .......... *G06F 40/186* (2020.01); *G06F 40/174* (2020.01); *G06V 30/412* (2022.01); *G06V 30/418* (2022.01)

(58) Field of Classification Search
CPC .... G06F 16/958; G06F 40/186; G06F 40/174; G06K 9/00483; G06K 9/00449; G06N 3/04; G06V 30/412; G06V 30/418
USPC ........................................................ 715/221
See application file for complete search history.

(56) References Cited

U.S. PATENT DOCUMENTS

| | | | |
|---|---|---|---|
| 6,014,677 A * | 1/2000 | Hayashi | G06F 16/93 715/205 |
| 7,492,949 B1 | 2/2009 | Jamieson | |
| 7,660,804 B2 | 2/2010 | Wen et al. | |
| 8,131,815 B1 * | 3/2012 | Perelman | G06F 40/103 709/217 |
| 8,140,589 B2 | 3/2012 | Petri | |
| 8,731,973 B2 * | 5/2014 | Anderson | G06F 40/174 705/4 |

(Continued)

FOREIGN PATENT DOCUMENTS

| | | |
|---|---|---|
| WO | 2007126320 A1 | 11/2007 |
| WO | 2020123464 A1 | 6/2020 |

OTHER PUBLICATIONS

"Field;" Microsoft Computer Dictionary; May 1, 2002; Microsoft Press; Fifth Edition; pp. 210-211.*

(Continued)

*Primary Examiner* — Andrew R Dyer
(74) *Attorney, Agent, or Firm* — Keller Preece PLLC

(57) ABSTRACT

A collaborative content management system (CMS) is disclosed herein for generating templates for received documents. The disclosed CMS recognizes that a document selected by a user for processing was previously processed by the CMS and that a user has previously added particular overlaid fillable fields to the document. When the determination is made, the system generates a recommendation to create a template of the document with the previously added overlaid fillable fields. In some embodiments, the CMS makes the recommendation to generate a template when the user creates, in a received document, identical overlaid fillable fields or field types to those created in the previously processed document.

20 Claims, 9 Drawing Sheets

(56) References Cited

U.S. PATENT DOCUMENTS

| | | | |
|---|---|---|---|
| 9,069,768 B1* | 6/2015 | Sampson | G06V 30/418 |
| 9,268,763 B1* | 2/2016 | Esho | G06F 40/143 |
| 9,372,916 B2 | 6/2016 | Stone et al. | |
| 9,396,540 B1* | 7/2016 | Sampson | G06V 30/414 |
| 9,535,969 B1* | 1/2017 | Epstein | G06F 16/27 |
| 9,779,063 B1* | 10/2017 | Dykema | G06F 40/186 |
| 9,799,082 B1* | 10/2017 | Raskin | G06F 16/9535 |
| 10,055,801 B2 | 8/2018 | Smith et al. | |
| 10,324,903 B1* | 6/2019 | Goldberg | G06F 16/13 |
| 10,354,000 B2 | 7/2019 | Wilczek et al. | |
| 10,579,725 B2 | 3/2020 | De Mello Brandao et al. | |
| 10,599,753 B1* | 3/2020 | Eisner | G06F 40/169 |
| 10,657,158 B2 | 5/2020 | Sheng et al. | |
| 10,796,082 B2* | 10/2020 | Jensen | G06F 40/174 |
| 10,922,340 B1* | 2/2021 | Yu | G06F 16/313 |
| 11,068,644 B1* | 7/2021 | Beiderman | G06F 16/248 |
| 2006/0106706 A1* | 5/2006 | LaBonty | G06Q 40/00 705/35 |
| 2006/0242591 A1* | 10/2006 | Van Dok | G06F 8/38 715/762 |
| 2007/0011606 A1* | 1/2007 | Bagheri | G06F 40/174 715/233 |
| 2007/0245001 A1* | 10/2007 | Bjork | G06F 40/143 709/223 |
| 2007/0271502 A1* | 11/2007 | Bedi | G06F 40/186 715/230 |
| 2009/0210459 A1* | 8/2009 | Nair | G06F 16/954 |
| 2011/0034158 A1* | 2/2011 | Bradley | H04M 3/42153 455/418 |
| 2011/0265020 A1* | 10/2011 | Fields | G06F 11/3668 715/780 |
| 2011/0301982 A1 | 12/2011 | Green, Jr. et al. | |
| 2012/0054592 A1* | 3/2012 | Jaffe | G06Q 10/10 715/224 |
| 2012/0192055 A1* | 7/2012 | Antebi | G06F 40/197 715/229 |
| 2012/0192064 A1* | 7/2012 | Antebi | G06Q 10/10 715/255 |
| 2012/0233250 A1* | 9/2012 | Man | G06F 16/38 709/204 |
| 2012/0317239 A1* | 12/2012 | Mulder | G06F 21/602 709/219 |
| 2013/0294694 A1* | 11/2013 | Zhang | G06V 30/1456 382/182 |
| 2014/0071467 A1* | 3/2014 | Asada | G06K 15/1872 358/1.9 |
| 2014/0214856 A1* | 7/2014 | Mahkovec | G06F 16/951 707/747 |
| 2014/0215301 A1 | 7/2014 | Stone et al. | |
| 2015/0012488 A1* | 1/2015 | van Rossum | G06F 16/1767 707/611 |
| 2015/0012528 A1* | 1/2015 | Kapadia | G06F 40/169 707/722 |
| 2015/0082140 A1* | 3/2015 | Babalola | G06F 40/186 715/223 |
| 2015/0178252 A1* | 6/2015 | Dunn | G06Q 10/103 715/234 |
| 2015/0178294 A1* | 6/2015 | Baldwin | G06F 40/197 707/695 |
| 2015/0378579 A1* | 12/2015 | Kaplinger | G06F 16/957 715/745 |
| 2016/0117304 A1* | 4/2016 | Graham | H04L 67/1097 715/224 |
| 2016/0241611 A1 | 8/2016 | Svn | |
| 2017/0041296 A1* | 2/2017 | Ford | G06F 16/951 |
| 2017/0220545 A1 | 8/2017 | Gururajan et al. | |
| 2017/0220546 A1* | 8/2017 | Codrington | G06F 3/0484 |
| 2017/0235735 A1* | 8/2017 | Ignatyev | G06Q 10/00 706/12 |
| 2017/0277754 A1* | 9/2017 | Terao | G06F 16/2379 |
| 2018/0024978 A1* | 1/2018 | Watanabe | G06F 3/0482 715/224 |
| 2018/0075008 A1* | 3/2018 | Ganta | H04L 51/04 |
| 2018/0089155 A1* | 3/2018 | Baron | G06F 40/194 |
| 2018/0095989 A1* | 4/2018 | Teofili | G06F 16/178 |
| 2018/0189369 A1* | 7/2018 | Baek | G06F 16/27 |
| 2018/0232394 A1* | 8/2018 | Danziger | G06F 16/172 |
| 2018/0285321 A1* | 10/2018 | Antony | G06V 30/412 |
| 2018/0285818 A1* | 10/2018 | Soltani | G06F 16/9024 |
| 2018/0307665 A1* | 10/2018 | Bayne | G06F 40/174 |
| 2019/0163478 A1* | 5/2019 | Cimadamore | G06F 9/30058 |
| 2019/0205422 A1* | 7/2019 | Ying | G06F 16/2358 |
| 2019/0354575 A1 | 11/2019 | Petti | |
| 2019/0378090 A1* | 12/2019 | Bastide | G06Q 10/103 |
| 2019/0392057 A1* | 12/2019 | Denoue | G06K 9/00483 |
| 2020/0104353 A1 | 4/2020 | Chua et al. | |
| 2020/0142552 A1* | 5/2020 | Borkar | H04L 67/02 |
| 2020/0151630 A1 | 5/2020 | Shakhnovich | |
| 2020/0210383 A1* | 7/2020 | Demaris | G06F 16/176 |
| 2020/0356635 A1* | 11/2020 | Szturo | G06F 40/58 |
| 2020/0364628 A1* | 11/2020 | Gabriel | G06Q 50/14 |
| 2021/0319171 A1* | 10/2021 | Wallace | H04L 67/42 |

OTHER PUBLICATIONS

"Template;" 2019; techterms.com; pp. 1-2.*
Lori Kaufman; How to Get Notified When Word wants to Save Changes to the Normal Template; May 21, 2015; How-To Geek; pp. 1-5.*
Katelyn Kelley; How to Insert a Floating Text Box in Microsoft Word; Jun. 25, 2018; smallbusiness.chron.com; pp. 1-2.*
McIntosh M., "Content Management Using the Rational Unified Process," Rational Software White Paper TP164, retrieved from http://sce.uhcl.edu/helm/RationalUnifiedProcess/papers/pdf/TP164.pdf, 2000, 22 pages.

* cited by examiner

GENERATING FILLABLE DOCUMENTS AND FILLABLE TEMPLATES IN A COLLABORATIVE ENVIRONMENT

TECHNICAL FIELD

The disclosed embodiments generally relate to generating fillable forms and fillable templates from received documents.

BACKGROUND

Some systems enable users to upload documents and add fillable fields to those documents. The documents with the fillable fields can then be sent out to various users so that those documents can be filled out. For example, a user may scan and upload a document (e.g., a school form to be filled out by a parent). When the document is uploaded the system may display the uploaded document and enable the user to select various fillable fields that are then added to the document. The user can cause the document with the fillable fields to be sent to desired recipients.

SUMMARY

Systems and methods are disclosed herein for automatically generating fillable forms and form templates both including overlaid fillable fields for documents received by a content management system (CMS). The overlaid fillable fields in both fillable forms and form templates may be generated based on previously processed information. That is, the CMS may be configured to receive documents that can be turned into fillable forms and/or fillable templates.

The CMS may turn the document into a fillable form using previously added overlaid fillable fields. When the CMS receives a document from a computing device associated with a user account of the CMS, the CMS may determine whether the user has previously uploaded or otherwise sent the same document to the CMS. For example, the CMS may determine that the content of the document matches the content of a previously processed document. The CMS may also determine that the previously processed document was subsequently modified by a user of the user account to include a set of overlaid fillable fields. Responsive to determining that the document includes the content that matches the content of the previously processed document, the CMS may retrieve the set of overlaid fillable fields that the user has added to the previously processed document. When the overlaid fillable fields have been retrieved, the CMS may generate for display the document with the set of overlaid fillable fields that the user added to the previously processed document.

The CMS may enable the user to edit the set of fields (e.g., move the fields on the document, add new fields, and/or remove fields) before saving the document with the new overlaid fillable fields. In some embodiments, one of the fields may be a signature field and the user may send out the document to be filled out and signed by other users of the CMS or people outside of the CMS (e.g., the document updated with the overlaid fillable fields or a link to the document may be sent via email, instant messenger, or another medium).

In addition, the CMS may turn the document into a fillable template using previously added overlaid fillable fields. For example, the CMS may receive a document from a computing device associated with a particular user account. When the document is received, the CMS may enable the user to add overlaid fillable fields to the document. The CMS may determine whether the received document is the same as a previously processed document and also whether the set of field types for the document matches a set of field types for the previously processed document. Responsive to determining that the field types in the sets match, the CMS may generate for display a prompt to generate a template for the first document. That is, the CMS may have determined that the user created the same fillable form as before and based on that, recommend to the user to generate a template.

The features and advantages described in this summary and the following detailed description are not all-inclusive. Many additional features and advantages will be apparent to one of ordinary skill in the art in view of the drawings, specification, and claims hereof.

The figures depict various example embodiments of the present technology for purposes of illustration only. One skilled in the art will readily recognize from the following description that other alternative example embodiments of the structures and methods illustrated herein may be employed without departing from the principles of the technology described herein.

DETAILED DESCRIPTION

System Overview

Figure 1:
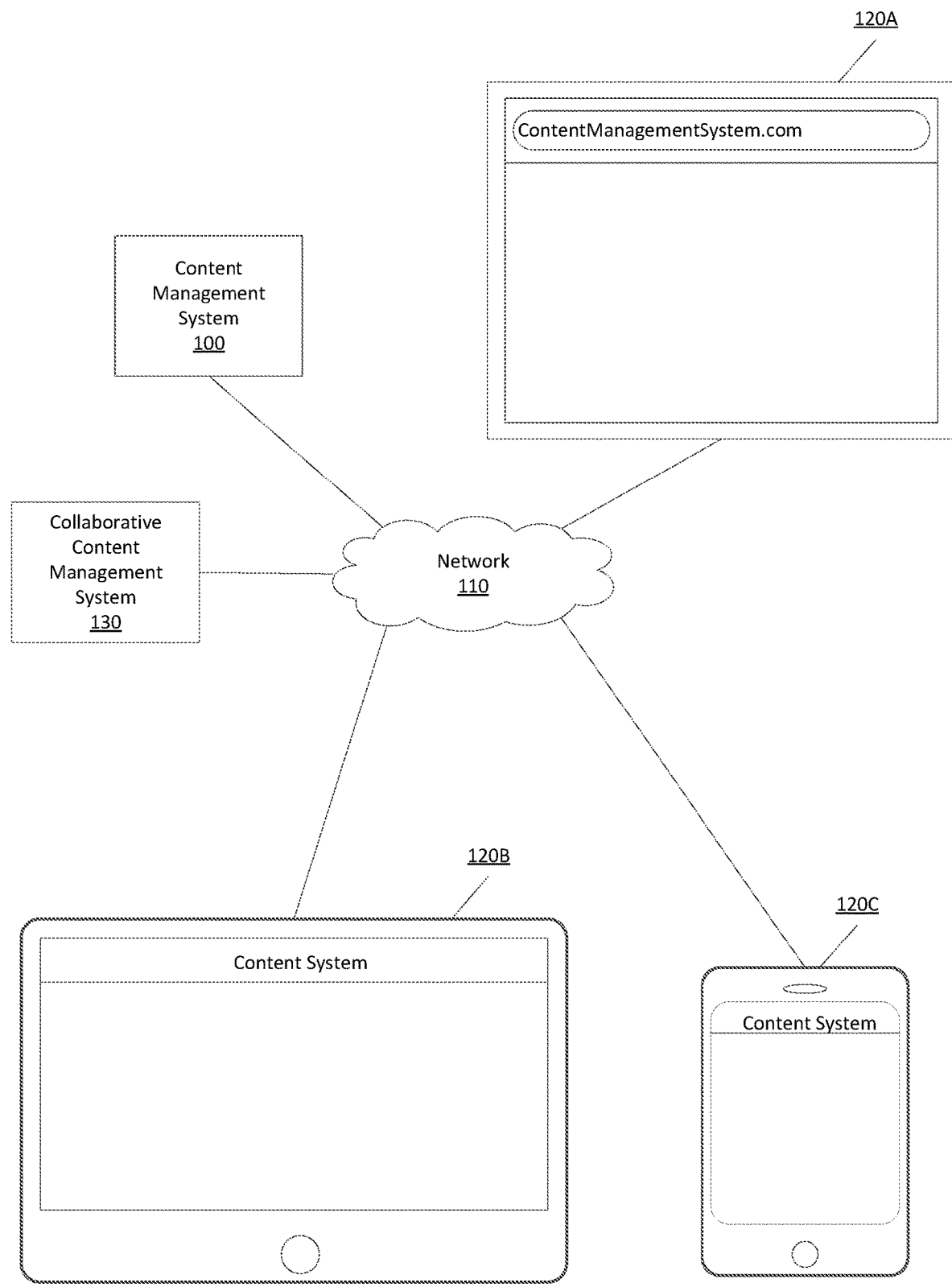
FIG. 1 shows a diagram of a system environment of a content management system and a collaborative content management system, according to example embodiments.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some example embodiments, the content stored by content management system 100 includes content items created by using third party applications, e.g., word processors, video and image editors, database management systems, spreadsheet applications, code editors, and so forth, which are independent of content management system 100.

In some example embodiments, content stored by content management system 100 includes content items, e.g., collaborative content items, created using a collaborative interface provided by collaborative content management system 130. In various implementations, collaborative content items can be stored by collaborative content management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In some example embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some example embodiments, the entities use custom and/or dedicated data communications technologies instead of, or in addition to, the ones described above.

In some example embodiments, content management system 100 and collaborative content management system 130 are combined into a single system. The system may include one or more servers configured to provide the functionality discussed herein for the systems 100 and 130.

Client Device

Figure 2:
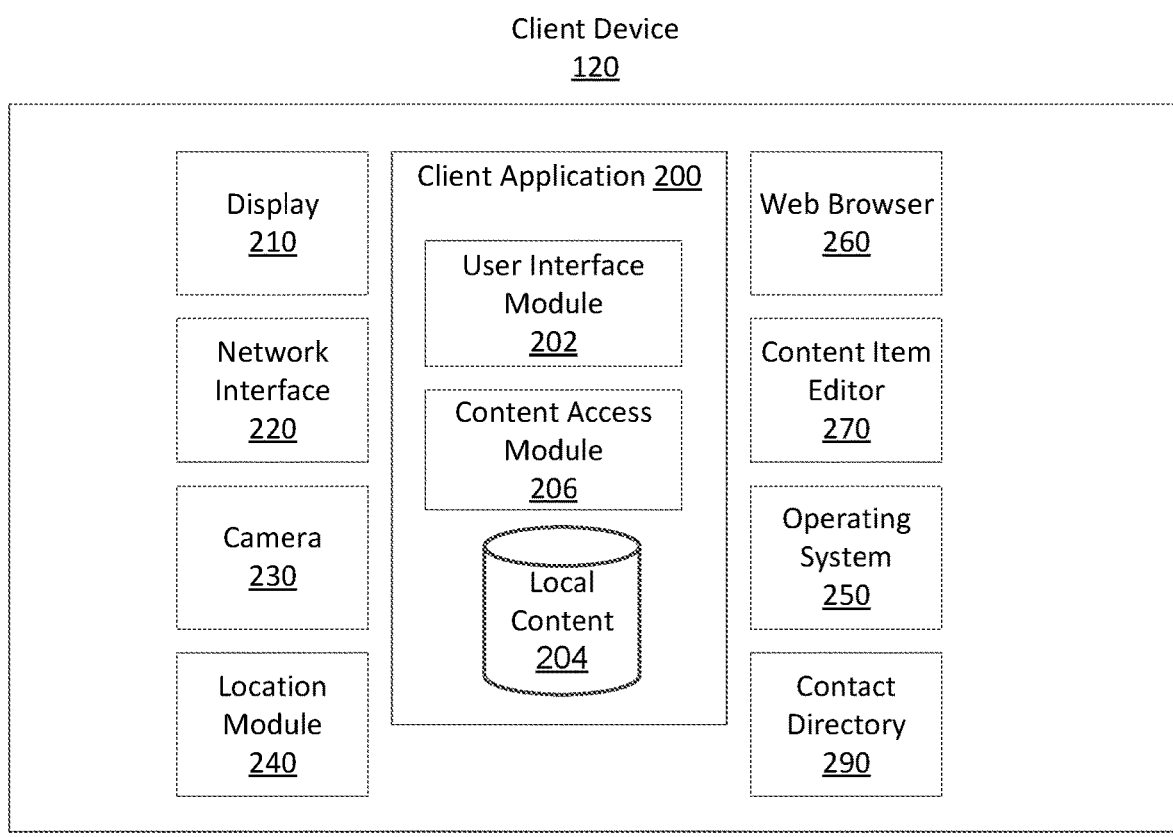
FIG. 2 shows a block diagram of components of a client device, according to example embodiments.

FIG. 2 shows a block diagram of the components of a client device 120 according to example embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain example embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
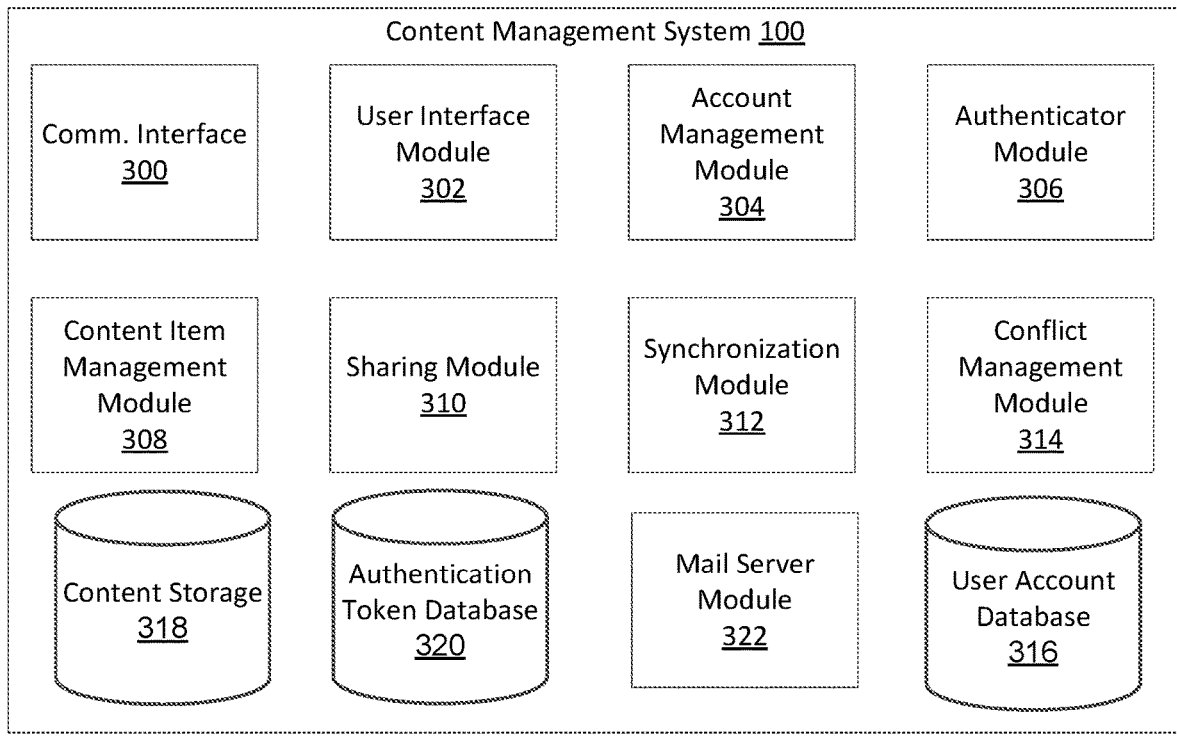
FIG. 3 shows a block diagram of a content management system, according to example embodiments.

FIG. 3 shows a block diagram of the content management system 100 according to example embodiments. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some example embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some example embodiments, the content entry includes multiple content pointers that point to multiple locations, each of which contains a portion of the content item.

In addition to a content path and content pointer, a content entry in some configurations also includes user account identifier that identifies the user account that has access to the content item. In some example embodiments, multiple user account identifiers can be associated with a single content entry indicating that the content item has shared access by the multiple user accounts.

In some example embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
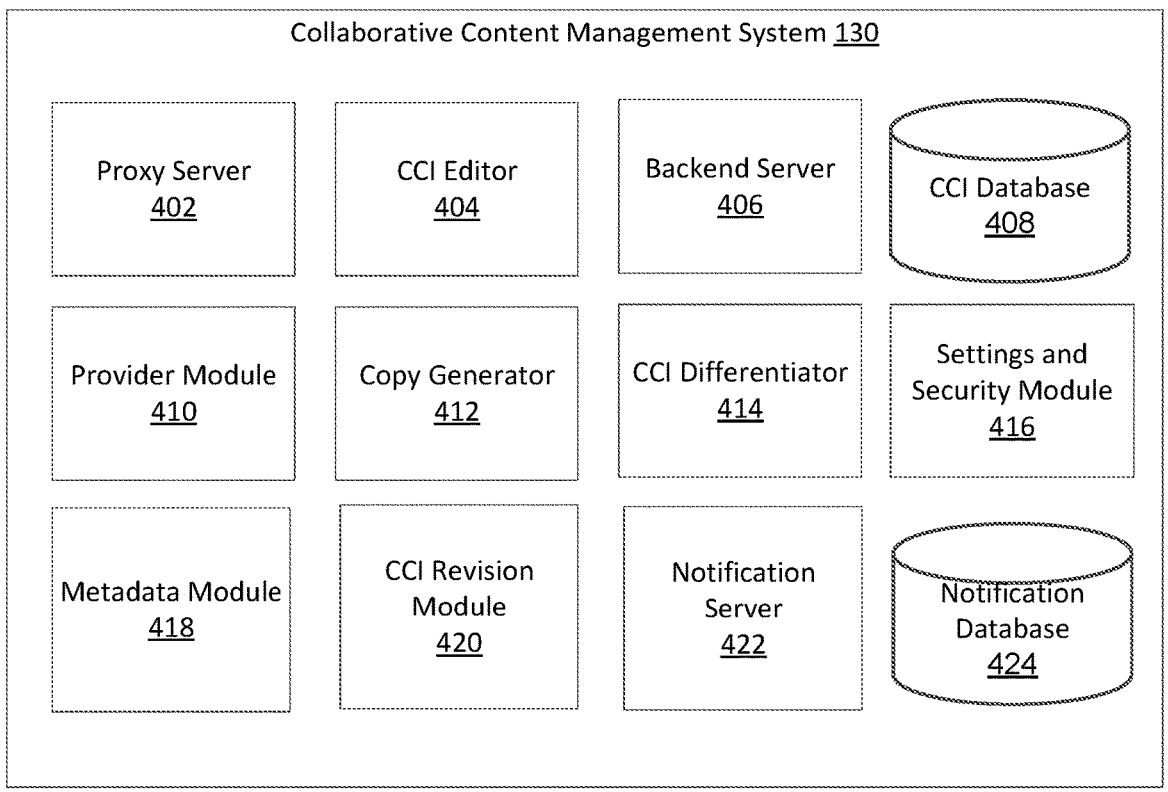
FIG. 4 shows a block diagram of a collaborative content management system, according to example embodiments.

FIG. 4 shows a block diagram of the collaborative content management system 130, according to example embodiments. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In example embodiments of FIG. 1, collaborative content management system 130 is shown as separate from content management system 100 and can communicate with it to obtain its services. In other example embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In alternative example embodiments, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In some example embodiments, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In some example embodiments, the access module can also provide the access link to user accounts via the network 110, while in other example embodiments the access link can be provided or made accessible to a user account and is accessed through a user account via the client device. In some example embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In some example embodiments, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some example embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differntial collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including memory (e.g., random access memory (RAM), read-only memory (ROM) and/or storage devices such as hard disks, solid state drives (SSDs), and other types of memory), network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Figure 7:
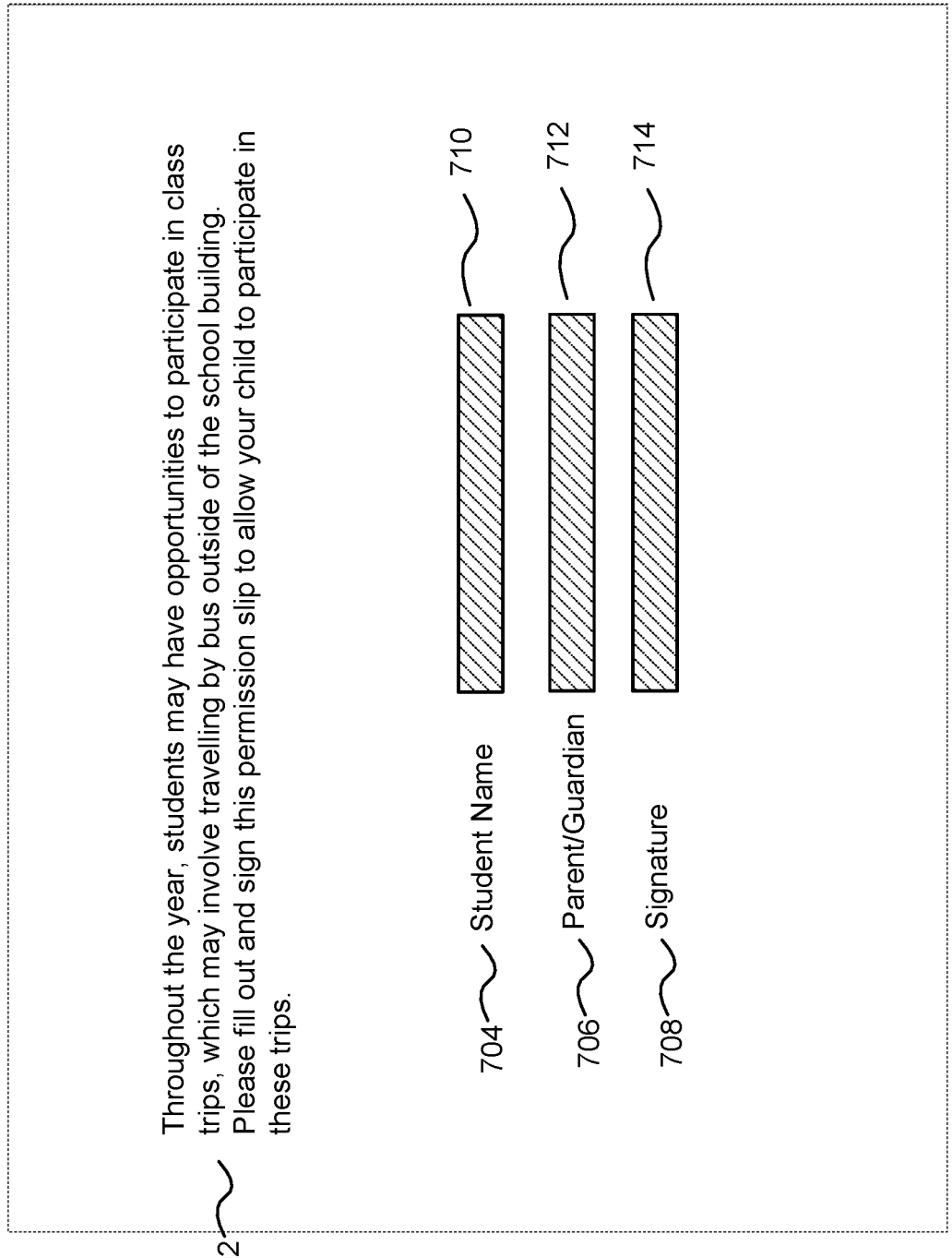
FIG. 7 illustrates a GUI of a fillable form that may be saved as a template, according to example embodiments.

The CMS or another suitable system may enable a user to select a document, add some overlaid fillable fields to the document and send the document out to other users and/or use accounts so that the overlaid fillable fields are filled in by the target user and/or user accounts and the data from those fields is sent back. In some embodiments, the CMS or the other suitable system may enable the document to be signed by the users that receive the document. For example, the document may be a parental permission form as illustrated in FIG. 7. The CMS or the other system may receive a file (e.g., a portable document format (PDF) file) and enable a user to add overlaid fillable fields to the file. In some embodiments, the file may already exist and be stored within the CMS and the user may select the file to turn into a fillable form. Some files may require a large number of overlaid fillable fields while other may require a small number. In all these instances the CMS may recognize when a user has previously added fields to the same or similar document and automatically add (or recommend adding) the previously added fields to the currently selected document. In addition, in some embodiments the CMS may recommend to a user to generate a template for a document to which a user added overlaid fillable fields and so that the template could be used when the same or similar document is selected again for processing. Thus, the system may automatically generate fillable forms and in certain instances recommend generating a template for a particular document.

Automatically Generating Fillable Forms

As discussed above, CMS 100 includes a communications interface 300 that is configured to receive data from client devices (e.g., client device 120). The CMS may receive, via communications interface 300, a document with a request to turn the document into a fillable form. As referred to herein the term "document" refers to a data file that may be stored in a memory and may be displayed on a display device. For example, a document may be a file in a Microsoft Word format, a portable document format (PDF), an image format, a Microsoft Excel format, an XML format, a PowerPoint document or another suitable presentation format document, a Hypertext Markup Language document, or any other suitable document format. In some embodiments, a content item may be a document. The document may, for example, be transmitted ("uploaded") to the CMS by a computing device (e.g., client device 120) associated with a user account of the CMS. For example, the computing device may execute a CMS client application that may include a graphical user interface ("GUI") that enables a user to select a document and cause the computing device to transmit the selected document to the CMS and instruct the CMS to generate a Tillable form out of the document. As another example, the CMS may already store one of more documents associated with the user account, and the user may select one of those documents (e.g., through GUI of the CMS client application), in which case the CMS may receive from the client device data identifying the document that is already stored on the CMS, without receiving the actual document from the client device. In some examples, both the CMS and the client device can store the same documents associated with the user account in a synchronized manner, in which case the user may select one of the documents stored on the client device and cause the client device to transmit to the CMS an identifier of the selected document without transmitting the actual document.

Although various embodiments are described with references to the CMS, the actions described herein may be performed by a different system and/or by a combination of another system and the CMS. For example, a different system may interface with the CMS where a user account is able to access documents in the CMS. The user interface of the CMS may enable a user to select a document and when the document is selected another system may perform the actions described herein. In some embodiments, as discussed below, the CMS may be adapted to perform the actions described herein. For example, modules and other programming code may be added to the CMS to perform these actions. In yet some embodiments, another system may perform all the actions described herein. For example, that system may have access to the CMS where a list of available documents may be displayed to the user. When a user selection of the document is received, the other system may request and receive the document or documents from CMS and perform all the other processing.

Figure 5:
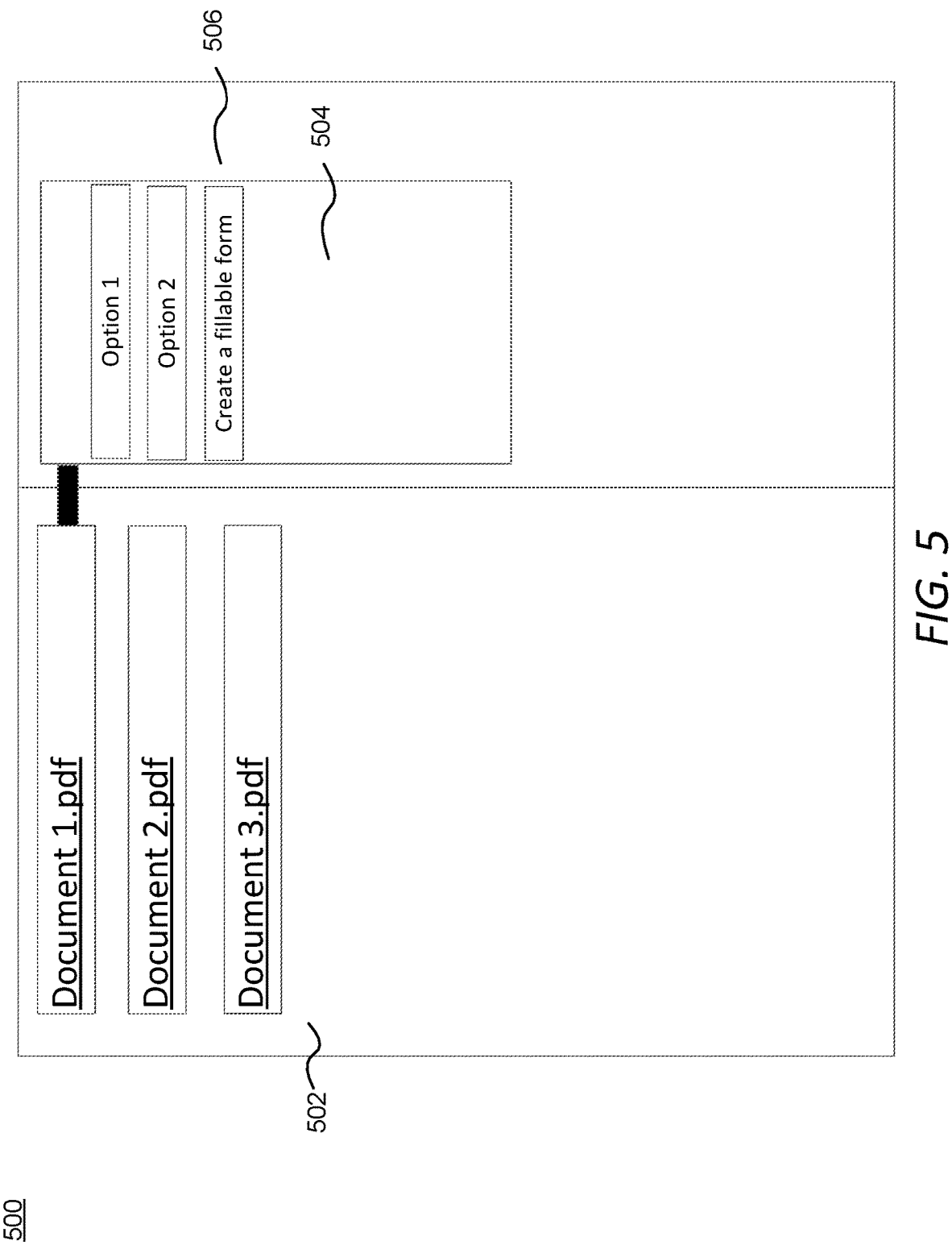
FIG. 5 illustrates a graphical user interface for selecting a document and instructing the CMS to turn the selected document into a fillable form, according to example embodiments.

FIG. 5 illustrates one possible GUI for selecting a document and instructing the CMS to turn the selected document into a fillable form. FIG. 5 includes a GUI 500 with various elements. Field 502 of GUI 500 includes a listing of available documents. These documents may be referred to as content items and those terms may be used interchangeable in some contexts. The CMS (e.g., CMS 100) may enable a user to select one of the documents (e.g., via a mouse click). When the user selects the document, the CMS may generate for display field 504 that includes multiple options for functions that can be executed against the selected document or documents. That is, the user may select multiple documents to turn into one or more fillable forms. The CMS enables the user to select option 506 to initiate a command to turn the selected document or documents into one or more fillable forms.

When the CMS receives the command to generate the fillable form with the document or a document selection, the CMS may determine whether the same or similar document has been previously processed by that CMS, that is, whether the CMS has already received a command to generate the fillable form for the same or similar document and generated the fillable form in response to that command. For example, the CMS may determine whether the document includes content that matches the content of a document previously processed by the CMS in association with the user account. For example, every time a user uploads a document to the CMS or otherwise selects a document for processing, the CMS may store that document so that the document is compared to future documents to determine whether the content is the same (or substantially the same). In some embodiments, the CMS may identify the text within the document and the position of the text to determine whether two documents are the same. In some embodiments, the CMS may generate a hash of each uploaded document and compare the hashes to determine whether two documents are the same.

In some embodiments, the CMS may use a trained neural network to determine if two documents match. The neural network may be trained using matching documents and metadata associated with those documents. The metadata may include names of the documents, sizes of the documents, and other suitable metadata. The CMS may input two documents and their corresponding metadata into a neural network trained to identify matching documents. The neural network may output, for example, a probability or another indicator that the two documents match. Based on output from the neural network, the CMS may determine whether the two documents match.

The CMS may also determine that the previously processed document was subsequently adapted by a user of the user account to include a set of overlaid fillable fields (e.g., the user has added overlaid fillable fields to the document and those fields were stored in association with the document). For example, when the CMS determines that the document was previously processed, the CMS may access the metadata of the previously processed document to determine whether any overlaid fillable field data exists for the document. In some embodiments, the metadata of the file may include an indicator that the overlaid fillable fields exist in the document. In addition, the metadata may include a link or another pointer to where the data structure(s) corresponding to the fields are stored. The overlaid fillable fields may be stored in association with a document identifier so that they can be retrieved. In some embodiments, the overlaid fillable fields may be stored in the metadata of the document. The overlaid fillable fields may be stored, for example, as XML structures. In some embodiments, these fields may be stored in a separate file in the CMS. The CMS may determine that there is a set of overlaid fillable fields associated with the previously processed document. In some embodiments, the CMS may determine that there are multiple sets of overlaid fillable fields associated with the received document. For example, the user may have uploaded a document multiple times and created a set of overlaid fillable fields for every uploaded document. The CMS may store every set of overlaid fillable fields together with an identifier or signature (e.g., a hash or another suitable identifier of the document). In some embodiments, the previously processed documents are documents that are received by the CMS (e.g., in association with a user account) and are stored within the CMS.

As referred to herein, the term overlaid fillable field refers to an area on a document that overlays a space on that document that can be filled in by a user operation (e.g., user input). The space in the original document may have been meant for a person to use a writing instrument to enter a response. Some examples of the overlaid fillable field may include a text box for entering text, a check mark, an option selection field, or another suitable field. Illustrations of overlaid fillable fields (e.g., 710, 712, and 714) are shown in FIG. 7. In some embodiments, the overlaid fillable fields include a signature field. The signature field enables the user input or otherwise provide a signature. The signature field may include a time of signature and may also include a workflow for the user to sign the document.

Responsive to determining that selected document matches a previously processed document (e.g., based on content within the documents, hashes of the documents, or another suitable method), the CMS retrieves the set of overlaid fillable fields previously generated for and stored in association with the previously processed document. For example, the set of overlaid fields may be stored as one or more data structures within the CMS. The CMS may retrieve that data structure and determine, based on the information in the data structure, where the overlaid fillable fields should be placed on the document. When that determination is made, the CMS may generate for display the document with the set of overlaid fillable fields.

In some embodiments, the CMS may determine that two documents are not identical, but similar enough that it may be desirable to display recommended overlaid fillable fields to the user. The CMS may compare textual data within the first document and the second document. For example, the CMS may perform optical character recognition on both documents. In response to determining that a predetermined amount of textual data matches between the documents, the CMS may determine that the documents match. For example, two documents may have ninety five percent of words that are the same but may have a few words that are different. In this case, it may be desirable to still recommend overlaid fillable fields to the user.

In some embodiments, the CMS may determine that the user does not wish to modify the overlaid fillable fields from a previous time that the user created those fields, and, in response, recommend to the user to create a template from the fillable form. Thus, the CMS may generate for display controls enabling a user to modify the set of overlaid fillable fields. Those controls may enable the user to remove fields, add fields, change positions of the fields, rename field names, and/or perform other operations. The CMS may receive an input from the user indicating acceptance of the set of overlaid fillable fields without modifying the overlaid fillable fields. That is, the CMS may determine that the user desires to generate the form with the same fields as the user created for the previously processed document. Responsive to the input from the user indicating acceptance of the set of overlaid fillable fields without modifying the overlaid fillable fields, the CMS may generate for display a prompt to generate a template for the document.

In some embodiments, the CMS may determine that the user modified a small number of overlaid fillable fields in response, recommend to the user to create a template from the fillable form. That is, the CMS may include a predetermined modification threshold and if the number of fields or a percentage of fields that have been modified does not meet the modification threshold, the CMS may recommend generating a template to the user. For example, the predetermined value may be a number of fields (e.g., one field), a percentage of fields (e.g., ten percent), a ratio of fields (e.g., one out of ten fields) or another suitable value. Thus, when a user modifies a certain number of fields, the CMS may perform a calculation to determine whether the threshold has been reached and if the threshold has not been reached, the CMS may recommend to the user to generate a template.

In some embodiments, the CMS may generate a template automatically when a document matching a previously processed document is selected by the user for generating a fillable form. The CMS may determine that a document matching a previously processed document has been selected and retrieve overlaid fillable fields that were added to the previously processed document. The CMS may automatically generate the template based on those fields.

Figure 6:
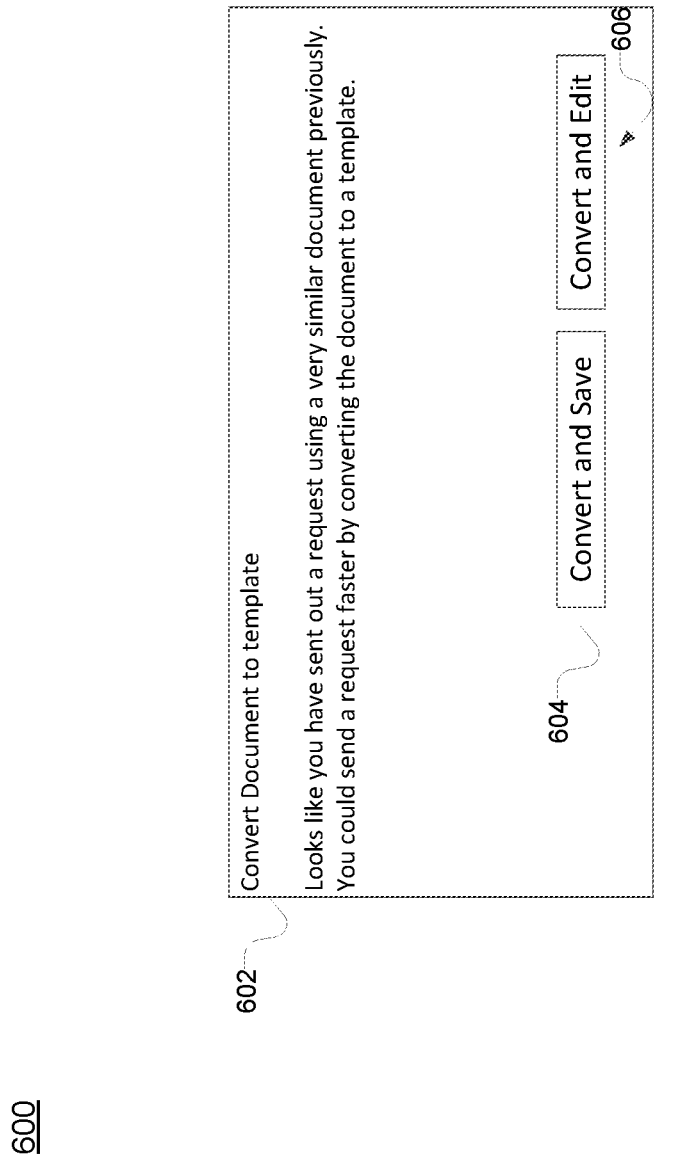
FIG. 6 illustrates a prompt for generating a fillable form template for a document, according to example embodiments.

FIG. 6 illustrates a prompt for generating a fillable form template for a document. FIG. 6 includes a GUI 600 for converting a document to a template. GUI 600 includes an element 602 with text requesting the user to take an action. GUI 600 also includes a selectable element 604 that, upon a selection by the user, causes the CMS to convert the document into a fillable form template and save the template. When the user selects element 604, the CMS retrieves the overlaid fillable fields and the document and inputs both into a conversion workflow. Once the conversion workflow is complete, the CMS stores the template for future use. Selectable element 606, upon selection by the user, causes the CMS to convert the document into a fillable form template and execute a template editor module so that the user is able to edit the template (e.g. add fields, remove fields, move fields, and/or perform other suitable actions). When the user is done editing the template, the CMS may store the document and/or the document identifier or signature (e.g., a hash) together with the overlaid fillable fields as the template for that document.

In some embodiments, the CMS stores the data associated with each overlaid field in association with the document. For example, the CMS may generate a data structure for each overlaid fillable field and store the associated data in a corresponding data structure.

In some embodiments, the user may not wish to generate a template from the document for various reasons, thus, the CMS may flag the document for not prompting the user to generate a fillable form template from this particular document in the future. That is, in response to a request to not generate the template for the first document, the CMS may store a flag within metadata associated with the document, the flag indicating to the CMS not to prompt the user to generate the template. For example, the flag may be a Boolean value stored with the document identifier or signature (e.g., a hash or another suitable signature) that indicates, when the Boolean value is zero, not to prompt the user to generate a fillable form template from the document. When the Boolean value is one, the CMS may prompt the user as described above.

The CMS may use various methods to determine whether two documents match. In some embodiments, the CMS may make the determination based on the content of the document. That is, the CMS may compare the content of the documents and the location of that content within the documents. In some embodiments, the CMS may determine if two documents match in a more stringent manner. That is, the CMS may determine whether the digital file associated with the document is the same. For example, the CMS may generate an identifier, or a signature associated with the document. The identifier or the signature may be a hash of the document generated using a hashing algorithm or another suitable identifier or signature. The CMS may also have hashed the previously processed document and stored that hash or another suitable identifier or signature in storage.

When the newly received document is hashed, the CMS may retrieve, from the storage within the CMS (e.g., from the storage associated with the particular user account), identifiers or signatures (e.g., hashes) of previously processed documents. The CMS may compare the identifier or signature (e.g., the hash or another suitable identifier or signature) associated with the newly received document with each identifier or signature (e.g., hash or another suitable identifier or signature) corresponding to a previously processed document. In response to determining that the identifier or signature (e.g., hash or another suitable identifier or signature) associated with the newly received document matches one of the stored identifiers or signatures (e.g., hashes or other suitable identifiers or signatures), the CMS may determine that the first document and the second documents are the same (e.g., the content of the first document matches the content of the second document). One advantage of using identifiers or signatures (e.g., hashes) is that the CMS does not have to store large documents and instead may store small values representing hashes for each of the documents.

When a document is first received by the CMS, that document must be processed so that when the same document is subsequently received, the CMS is able to perform the actions described above. Thus, when the CMS receives a document and determines that the document has not previously been processed, the CMS generates for display that document and a plurality of selectable field types together with controls that enable a user to add overlaid fillable fields to the document by selecting field types and placing those field types onto the displayed document.

The CMS may receive a user selection of one or more selectable field types and corresponding locations and generate a data structure for each field. The data structure may include the type of field, the name of field, location of the field within the document (e.g., page number and/or coordinates of the field) and/or other suitable parameters. The CMS may store the document together with one or more overlaid fillable fields in the user account.

In some embodiments, the CMS may determine that the received document has not been previously processed in association with the user account. For example, the particular user may not have previously uploaded this particular document. In those instances, the CMS may look outside of the user account for a matching document. For example, the CMS may hash or otherwise store documents updated by different users. The CMS may store various overlaid fillable fields added by those users. When the fields are stored, the CMS may anonymize the user created fields and store them in a repository (e.g., content storage 318). Thus, responsive to determining that the received document includes content that does not match content of any document stored in association with the user account (or that the hash of the document does not match a hash of another document received from the user), the CMS may compare the received document with documents received by the CMS from (or stored by the CMS in association with) other user accounts. The CMS may identify a document that matches the received document and generate for display the received document with a set of overlaid fillable fields associated with the document. The CMS may anonymize the user created overlaid fillable fields based on multiple users creating one or more of the same fields in a particular document. That is, the CMS may receive the same document from various users and determine that a plurality of those users added a specific set of fields to the document. In those cases, the CMS may add only those fields to the repository that were created by multiple users. In some embodiments, the CMS may take into account the location of the fields within the document. For example, if the field type is in a substantially the same place within the document, the CMS may determine that multiple users added the same field to the document. The CMS may also take into account field names. In some embodiments, the CMS may determine that a location of the field is in the same portion of the same page to determine that two fields are in a substantially the same location within the document.

Automatically Generating Fillable Form Templates

In some embodiments, a CMS may generate a template for a received document. The CMS may receive a document from a computing device associated with a user account of the CMS. As described in connection with FIG. 5, the CMS may receive a command to generate a fillable form from a document. As described above, the CMS may generate for display a field editor enabling the user to create overlaid fillable fields to be placed at various locations within the document. When the user finishes creating one or more fields, the CMS may receive a set of overlaid fillable fields to be added to the document.

The CMS may determine whether the newly received or selected document matches any previously processed documents associated with a particular user account. For example, the CMS may determine, based on data in the user account, that the document includes content that matches content of a previously processed document that was subsequently modified to include its own set of overlaid fillable fields. As described above, in some embodiments, the CMS may use document hashes to determine whether two documents match. Thus, the CMS may generate a hash for each document (e.g., the newly received document and previously processed documents) and compare the hashes. Responsive to the hashes matching, the CMS may determine that the content of the documents matches.

As another example, the CMS may determine that the newly received or selected document matches a previously processed document based at least in part on a determination that a set of field types corresponding to the set of overlaid fillable fields that the user created for the newly received document matches the set of field types corresponding to the set of overlaid fillable fields that the user created for the previously processed document. That is, the CMS determines whether the user picked the same number of fields of the same field types for both a previously processed document and the newly received document. For example, if a user selected three text fields, two checkmark fields, and one signature field for both the newly received document and the previously processed document, the CMS may determine that the field types match.

In some embodiments, in order to determine whether there is a match between the new document and the previously processed document, the CMS may also take into account a position, in the document, associated with each field type. That is, the CMS determines a corresponding position of each field type within the document and compares each corresponding position of each field type with each corresponding position of each field type of the other document. For example, the CMS may determine that a newly received document includes text field and the previously processed document also includes a text field. If those text fields are detected at a substantially the same position in the document, the CMS may find a match in those fields. That is, the fields may be within a predetermined number of pixels of each other, within a predetermined area of each other, and/or within another suitable distance of each other. In some embodiments, the CMS may take into account the number of fields that match and/or a ratio/percentage of fields that match. For example, if five out of six fields match, the CMS may find a match between the fields.

Responsive to determining that the fields match (e.g., based on a determination that their number, type, location, and/or other parameters match), the CMS generates for display a prompt to generate a template for the first document. The CMS may generate a prompt as described in relation to FIG. 6. When the CMS receives a user selection of element 606, the CMS may generate for display a GUI 700 of FIG. 7. FIG. 7 illustrates a GUI of a fillable form that may be saved as a template. FIG. 7 includes text 702 which does not have an associated overlaid fillable field. Elements 704, 706, and 708 include corresponding overlaid fillable fields 710, 712, and 714 respectively. The CMS may receive an input from a user to accept these fields and save them as a template.

Figure 8:
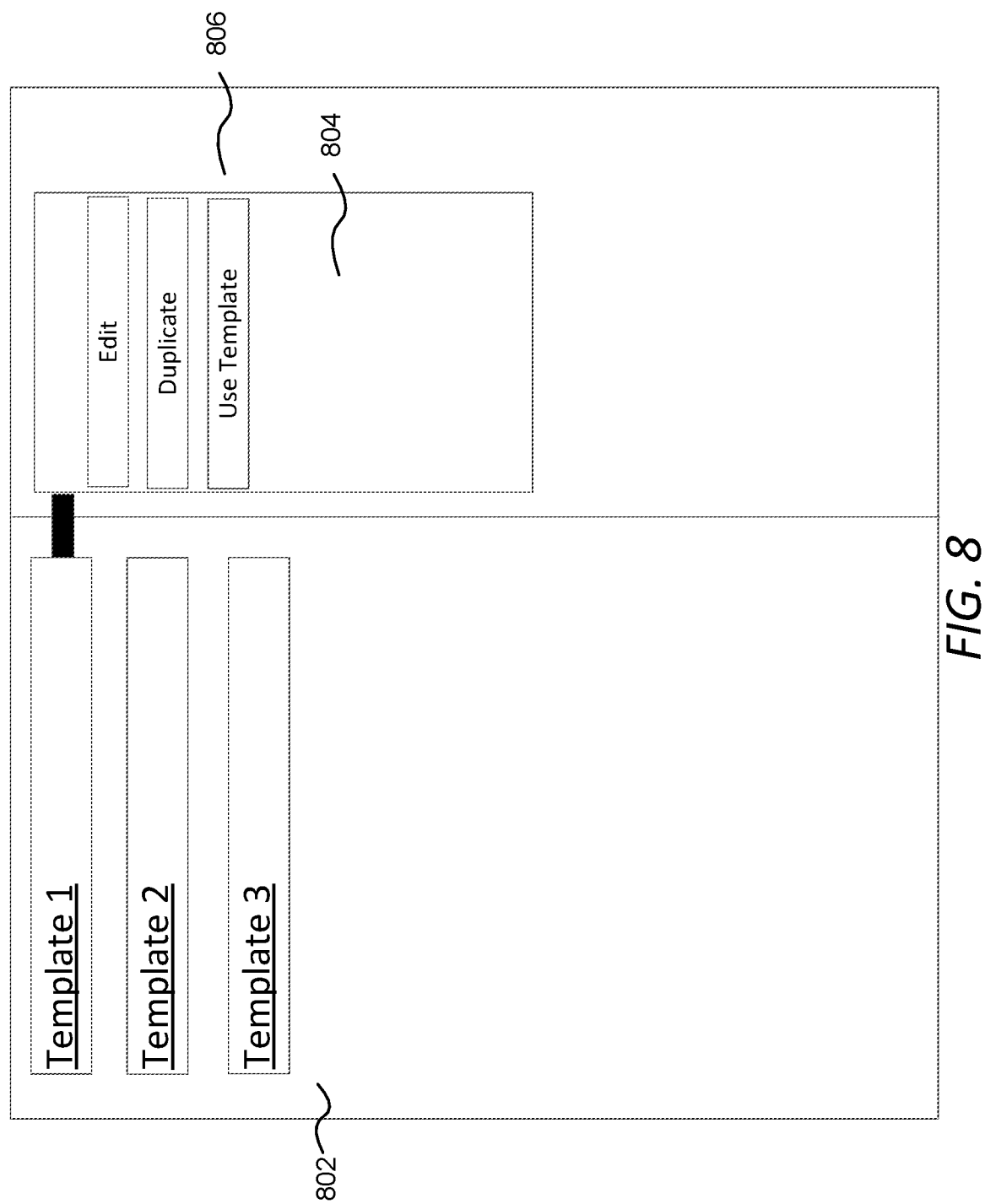
FIG. 8 illustrates a GUI for enabling a user to select a template to use, according to example embodiments.

In some embodiments, the CMS may receive, in response to the prompt, a command from the user to generate the template. For example, the user may select element 604 (convert and save) of FIG. 6. Based on receiving the command to generate the template, the CMS may generate the template with the set of overlaid fillable fields and store the template in association with the user account. The CMS may store the template together with other available templates and enable the user to select a template to use. FIG. 8 illustrates a GUI for enabling a user to select a template to use. GUI 800 includes a portion 802 that lists all available templates. When a user selects an available template, the CMS may generate for display portion 804 that includes one or more functions that enable the user to manipulate or use the template. The user may select Use Template function 806 to use the template.

In some embodiments, the CMS may store multiple sets of field types for the same document and select one set of field types. For example, if the CMS received the same document multiple times and different field types were added by the user, the CMS may have stored multiple sets of field types for the document. Thus, the CMS may retrieve a plurality of sets of overlaid fillable fields that were added to previously processed documents matching the newly received document. The CMS may compare the set of field types created for the newly received document with each set of field types created for the previously processed documents. The CMS may identify a matching set of field types and select the matching set of field types to be used for the template.

In some embodiments, the CMS may provide a choice of which set of fields to add to the template. Thus, the CMS may generate for display a selectable indicator that, when selected, generates for display multiple instances of the first document each instance including a set of field types. For example, the CMS may have received the same document three times from the user and each time the user created some overlaid fillable fields to be added to the document. The CMS may generate for display three instances of the document each with a set of corresponding overlaid fillable fields.

The CMS may enable the user to select one of the displayed documents with the corresponding set of overlaid fillable fields. In response to a user selection of an instance of the document, the CMS may generate a template including the set of overlaid fillable fields associated with the selected instance of the document.

Figure 9:
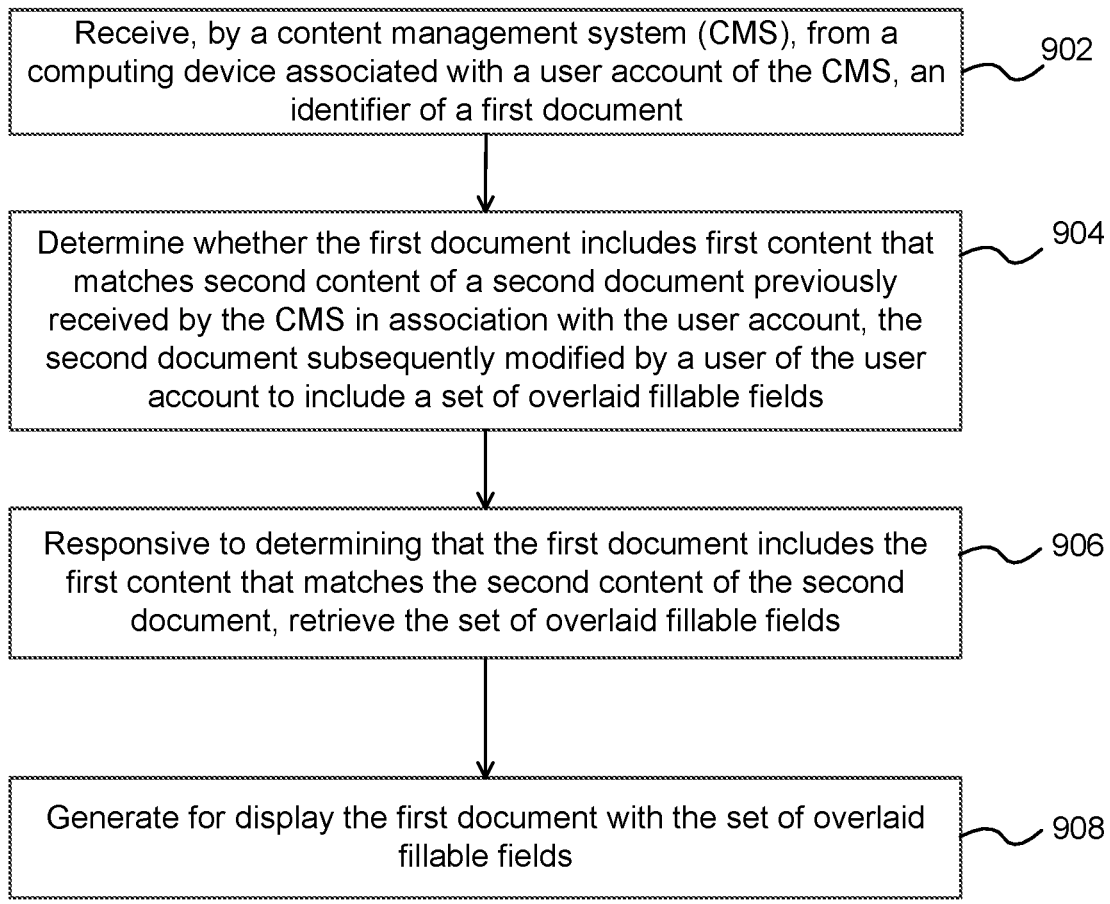
FIG. 9 is a flowchart of illustrative actions for generating fillable forms, according to example embodiments.

FIG. 9 is a flowchart of illustrative actions for generating fillable forms. At 902 communications interface 300 of CMS 100 receives a first document, the first document transmitted from a computing device (e.g., client device 120) associated with a user account of the CMS. At 904, CMS 100 (e.g., via content item management module 308 or another suitable module) determines whether the first document includes first content that matches second content of a second document previously processed by the CMS in association with the user account, the second document subsequently modified by a user of the user account to include a set of overlaid fillable fields.

At 906, CMS 100 (e.g., via content item management module 308 or another suitable module), responsive to determining that the first document includes the first content that matches the second content of the second document, retrieves (e.g., from content storage 318 or another suitable storage) the set of overlaid fillable fields. At 908, CMS 100 (e.g., via user interface module 302) generates for display the first document with the set of overlaid fillable fields. In some embodiments, the CMS may transmit the document and the overlaid fillable fields to a client device 120. Client device 120 may use client application 200 to generate for display the document and the overlaid fields using, for example, display 210.

Figure 10:
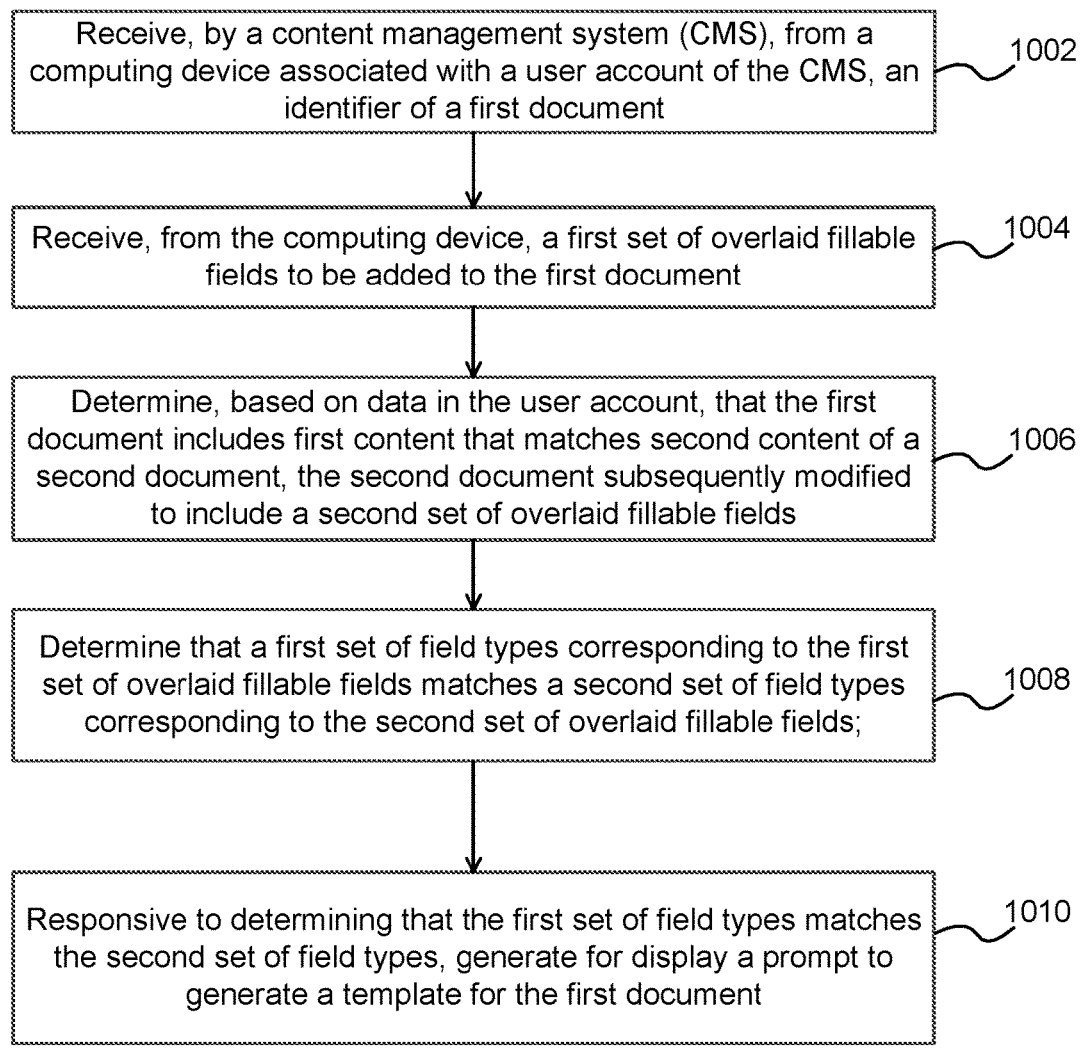
FIG. 10 is a flowchart of illustrative actions for generating templates for fillable forms, according to example embodiments.

FIG. 10 is a flowchart of illustrative actions for generating templates for fillable forms. At 1002, CMS 100 (e.g., via communications interface 300) receives a first document, the first document is transmitted from a computing device associated with a user account of the CMS. At 1004, CMS 100 (e.g., via user interface module 302) receives, from the computing device, a first set of overlaid fillable fields to be added to the first document. In some embodiments, the CMS may receive the first set of overlaid fillable fields from client device 120.

At 1006, CMS 100 (e.g., via content management module 308) determines, based on data in the user account, that the first document includes first content that matches second content of a second document, the second document subsequently modified to include a second set of overlaid fillable fields. At 1008, CMS 1000 (e.g., via content management module 308) determines that a first set of field types corresponding to the first set of overlaid fillable fields matches a second set of field types corresponding to the second set of overlaid fillable fields. At 1010, CMS 100, responsive to determining that the first set of field types matches the second set of field types, generates for display (e.g., using user interface module 302) a prompt to generate a template for the first document. In some embodiments, the CMS may transmit the prompt to client device 120. Client device 120 may use client application 200 to generate for display the prompt using, for example, display 210.

In some embodiments, when a new document is received by the CMS or when a user selects a document for generating a fillable form, the CMS may determine that the same or similar document was previously processed, and a template has been generated for the document. Based on the determination, the CMS may recommend to the user to use the existing template. For example, the CMS may determine that the document was previously processed by using any methods described above. That is, as discussed above, the CMS may hash the documents to determine that the documents have the same content, input the documents into a neural network, compare the textual data of the documents, or determine that two documents are the same using another method. Thus, it should be emphasized that in some embodiments the CMS may determine that the documents are the same ("matching") even when they are not identical, that is, even when their hashes don't match. For example, the CMS may determine that two documents corresponding to two different photos or scans of the same physical document are matching even though the photos or scans may not be identical.

Upon making the determination that the two documents match, the CMS may access the metadata of the previously processed document to determine whether a template associated with the document exists. If the CMS determines that a template exists, the CMS may retrieve the overlaid fillable fields associated with the template and generate for display the document with the overlaid fillable fields. In some embodiments, the CMS may prompt the user to apply the existing template and display the overlaid fillable fields, and in response to the user accepting the prompt, the CMS may generate for display the document with the overlaid fillable fields of the template.

In some embodiments, when a new document is received, the CMS may determine that the new document has not been previously processed (e.g., based on any methods describe above). The CMS may then receive one or more inputs from a user when the user is creating one or more overlaid fillable fields for the document. When the CMS determines that a threshold number of overlaid fillable fields were created by the user, the CMS may generate for display a prompt recommending that the user create a template from the document and the overlaid fillable fields already created so that the user could reuse these fields in the future. In some embodiments, the CMS may generate a temporary template when the user is creating the fields. The temporary template may be stored in CMS until the user selects an option indicating that a template is to be created or is not to be created. In response to the user rejecting creation of the template, the CMS may delete the temporary template. In response to the user accepting the creation of the template, the CMS may convert the temporary template into a regular template and store the template within the CMS. In some embodiments, the temporary template may expire upon expiration of the user session that generates a fillable form.

ADDITIONAL CONSIDERATIONS

Reference in the specification to "one embodiment" or to "example embodiments" means that a particular feature, structure, or characteristic described in connection with the example embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other example embodiments may include other modules. In addition, other example embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present technology is not described with reference to any particular programming language. It will be appreciated that a variety of programming languages may be used to implement the teachings of the present technology as described herein, and any references above to specific languages are provided for disclosure of enablement and best mode of the present technology.

While the technology has been particularly shown and described with reference to a preferred embodiment and several alternate example embodiments, it will be understood by persons skilled in the relevant art that various changes in form and details can be made therein without departing from the spirit and scope of the technology.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific example embodiments and implementations for illustration, but various modifications can be made without deviating from the scope of the example embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present technology is intended to be illustrative, but not limiting, of the scope of the technology, which is set forth in the following claims.

What is claimed is:

1. A method comprising:
    receiving, by a content management system (CMS), from a computing device associated with a user account of the CMS, an identifier of a first document uploaded to the CMS and comprising first content;
    determining that the CMS previously received and processed a second document comprising second content matching the first content of the first document by:
        comparing the first content of the first document to content of a plurality of documents previously uploaded and processed by the CMS in association with the user account; and
        identifying the second document as matching the first document based on the first content matching the second content;
    determining that the second document was adapted by a user of the user account to include a set of overlaid fillable fields;
    responsive to determining that the CMS previously received and processed the second document comprising the second content matching the first content of the first document, retrieving the set of overlaid fillable fields;
    generating for display the first document with the set of overlaid fillable fields by adding the set of overlaid fillable fields to the first document;
    generating for display a plurality of controls enabling a user to modify the set of overlaid fillable fields, the plurality of controls comprising controls for determining which of the set of overlaid fillable fields to include in a template and positions of the set of overlaid fillable fields within the template;
    receiving an input from the user indicating acceptance of the set of overlaid fillable fields without modifying the set of overlaid fillable fields; and
    responsive to the input from the user indicating acceptance of the set of overlaid fillable fields without modifying the set of overlaid fillable fields, generating for display a prompt to generate the template for the first document comprising the set of overlaid fillable fields.

2. The method of claim 1, further comprising:
    in response to a request to generate the template for the first document, generating the template comprising the set of overlaid fillable fields; and
    storing the template with one or more other templates associated with the user account.

3. The method of claim 1, further comprising in response to a request to generate the template for the first document, storing data associated with each overlaid field, wherein the data is stored in association with the first document.

4. The method of claim 1, further comprising:
    in response to a request to not generate the template for the first document, storing a flag within metadata associated with the first document indicating not to prompt the user to generate the template.

5. The method of claim 1, wherein determining that the CMS previously received and processed the second document comprising second content matching the first content of the first document comprises:
    generating a signature associated with the first document;
    retrieving, from storage within the CMS associated with the user account, a plurality of signatures, wherein each signature of the plurality of signatures is associated with a corresponding document;
    comparing the signature associated with the first document with signatures in the plurality of signatures; and
    in response to determining that the signature associated with the first document matches a signature of the plurality of signatures, determining that the first document includes the first content that matches second content of the second document.

6. The method of claim 1, further comprising:
    receiving the second document prior to receiving the first document;
    determining the set of overlaid fillable fields by:
        generating for display the second document and a plurality of selectable field types;
        receiving a user selection of one or more selectable field types and corresponding locations within the second document; and
        storing the second document in association with one or more overlaid fillable fields associated with the one or more selectable field types;
    retrieving the set of overlaid fillable fields by determining links to data structures corresponding to the set of overlaid fillable fields from metadata associated with the second document; and
    adding the set of overlaid fillable fields to the first document by converting the first document into a fillable form and inserting the links to the data structures into metadata associated with the first document.

7. The method of claim 1, wherein determining that the CMS previously received and processed the second document comprising second content matching the first content of the first document comprises:
    comparing first textual data within the first document and second textual data within the second document; and
    in response to determining that a predetermined amount of the first textual data matches the second textual data, determining that the first content of the first document matches the second content of the second document.

8. The method of claim 1, further comprising:
comparing the first document with a plurality of other documents stored by the CMS in association with one or more other user accounts;
identifying, within the plurality of other documents associated with the one or more other user accounts, an additional document that matches the first document; and
generating for display the first document with a set of overlaid fillable fields associated with the additional document.

9. A system comprising:
at least one processor; and
at least one non-transitory computer readable storage medium storing instructions that,
when executed by the at least one processor, cause the system to:
receive, from a computing device associated with a user account, an identifier of a first document uploaded in connection with the user account and comprising first content;
determine that a second document comprising second content was previously received and processed in connection with the user account, the second content matching the first content of the first document, by:
comparing the first content of the first document to content of a plurality of documents previously uploaded in connection with the user account; and
identifying the second document as matching the first document based on the first content matching the second content, the second document comprising an overlaid fillable field;
incorporate the overlaid fillable field from the second document into the first document by adding the overlaid fillable field to the first document in response to determining that the second document was previously received and processed in connection with the user account and comprises the second content matching the first content of the first document; and
provide, for display within a graphical user interface on the computing device, the first document with the overlaid fillable field;
generate for display a plurality of controls enabling a user to modify the overlaid fillable field, the plurality of controls comprising controls for determining whether to include the overlaid fillable field in a template and a position of the overlaid fillable field within the template;
receive an input from the user indicating acceptance of the overlaid fillable field without modifying the overlaid fillable field; and
responsive to the input from the user indicating acceptance of the overlaid fillable field without modifying the overlaid fillable field, generate for display a prompt to generate the template for the first document comprising the overlaid fillable field.

10. The system of claim 9, further comprising instructions that, when executed by the at least one processor, cause the system to:
in response to a request to generate the template for the first document, generate the template comprising the overlaid fillable field; and
store the template with one or more other templates associated with the user account.

11. The system of claim 9, further comprising instructions that, when executed by the at least one processor, cause the system to:
receive an indication to generate the template based on a user interaction with the prompt; and
associate metadata corresponding to the overlaid fillable field with the first document to generate the template.

12. The system of claim 9, further comprising instructions that, when executed by the at least one processor, cause the system to:
receive an indication to not generate the template based on a user interaction with the prompt; and
associate metadata with the first document, the metadata comprising an indication to not provide a prompt to generate the template in the future.

13. The system of claim 9, further comprising instructions that, when executed by the at least one processor, cause the system to:
determine a position of the overlaid fillable field within the second document, the overlaid fillable field corresponding to a position of the second content within the second document; and
identify the first content within the first document based on the position of the overlaid fillable field within the second document.

14. The system of claim 9, wherein determining that the first document includes the first content that matches the second content of the second document comprises:
inputting the first document, the second document, and metadata associated with each of the first document and the second document into a neural network trained to identify matching documents; and
determining, based on output from the neural network, that the first content of the first document matches the second content of the second document.

15. A non-transitory computer-readable storage medium storing executable instructions that, when executed by at least one processor, cause a computer device to:
receive, from a computing device associated with a user account, an identifier of a first document uploaded in connection with the user account and comprising first content;
determine that a second document comprising second content was previously received and processed in connection with the user account, the second content matching the first content of the first document, by:
comparing the first content of the first document to content of a plurality of documents previously uploaded in connection with the user account; and
identifying the second document as matching the first document based on the first content matching the second content, the second document comprising an overlaid fillable field;
incorporate the overlaid fillable field from the second document into the first document by adding the overlaid fillable field to the first document in response to determining that the second document was previously received and processed in connection with the user account and comprises the second content matching the first content of the first document;
provide, for display within a graphical user interface on the computing device, the first document with the overlaid fillable field;
generate for display a plurality of controls enabling a user to modify the overlaid fillable field, the plurality of controls comprising controls for determining whether to include the overlaid fillable field in a template and a position of the overlaid fillable field within the template;

receive an input from the user indicating acceptance of the overlaid fillable field without modifying the overlaid fillable field; and responsive to the input from the user indicating acceptance of the overlaid fillable field without modifying the overlaid fillable field, generate for display a prompt to generate the template for the first document comprising the overlaid fillable field.

16. The non-transitory computer-readable storage medium of claim 15, further comprising instructions that, when executed by the at least one processor, cause the computer device to:

in response to a request to generate the template for the first document, generating the template comprising the overlaid fillable field; and storing the template with one or more other templates associated with the user account.

17. The non-transitory computer-readable storage medium of claim 15, further comprising instructions that, when executed by the at least one processor, cause the computer device to:

determine a position of the overlaid fillable field within the second document, the overlaid fillable field corresponding to a position of the second content within the second document; and identify the first content within the first document based on the position of the overlaid fillable field within the second document.

18. The non-transitory computer-readable storage medium of claim 15, further comprising instructions that, when executed by the at least one processor, cause the computer device to:

generate for display a plurality of controls enabling a user to modify a set of overlaid fillable fields comprising the overlaid fillable field within the first document;

receive a user input indicating acceptance of the set of overlaid fillable fields without modifying the set of overlaid fillable fields; and responsive to the user input indicating acceptance of the set of overlaid fillable fields without modifying the set of overlaid fillable fields, generate, for display, a prompt to generate a template for the first document comprising the set of overlaid fillable fields.

19. The non-transitory computer-readable storage medium of claim 15, wherein determining that the first document includes the first content that matches the second content of the second document comprises:

inputting the first document, the second document, and metadata associated with each of the first document and second document into a neural network trained to identify matching documents; and determining, based on output from the neural network, that the first document includes the first content that matches the second content of the second document.

20. The non-transitory computer-readable storage medium of claim 15, further comprising instructions that, when executed by the at least one processor, cause the computer device to:

generate the template by associating metadata corresponding to the overlaid fillable field with the first document to generate the template.

\* \* \* \* \*